United States Patent [19]
Perchak

[11] Patent Number: 6,054,717
[45] Date of Patent: *Apr. 25, 2000

[54] BEAM CENTERING SYSTEM

[75] Inventor: Robert M. Perchak, Dayton, Ohio

[73] Assignee: Mirage Development Ltd, Dayton, Ohio

[ * ] Notice: This patent is subject to a terminal disclaimer.

[21] Appl. No.: 09/115,334

[22] Filed: Jul. 14, 1998

[51] Int. Cl.$^7$ .................................................. G01N 21/86
[52] U.S. Cl. ..................... 250/559.3; 250/216; 356/138
[58] Field of Search ................ 250/559.3, 559.35, 250/216, 221, 222.1; 356/138, 375; 359/15

[56] References Cited

U.S. PATENT DOCUMENTS 5,393,973  2/1995  Blau .......................................... 250/221
5,760,932  6/1998  Perchak .................................... 356/138

*Primary Examiner*—Que T. Le
*Attorney, Agent, or Firm*—Joseph G. Nauman

[57] ABSTRACT

A passive target device has as its principal element an optical axcicon having an optical axis which is intended to be aligned with a reference beam. The axicon has a geometric center line coincident with its optical axis and includes at least one facet which will form a reference image when the optical axis is aligned with the reference beam, such image being symmetrical in a plane perpendicular to the optical axis. This optical axicon is mounted in a holder, such as a tubular body, having an inlet window and a output or display window, and is adapted to be supported a distance away from the source of the beam, which may vary from less than one meter up to several hundred meters. Different forms of optical elements may be utilized with the axicon, the elements employing one or more like facets arranged symmetrically about the optical axis.

16 Claims, 4 Drawing Sheets

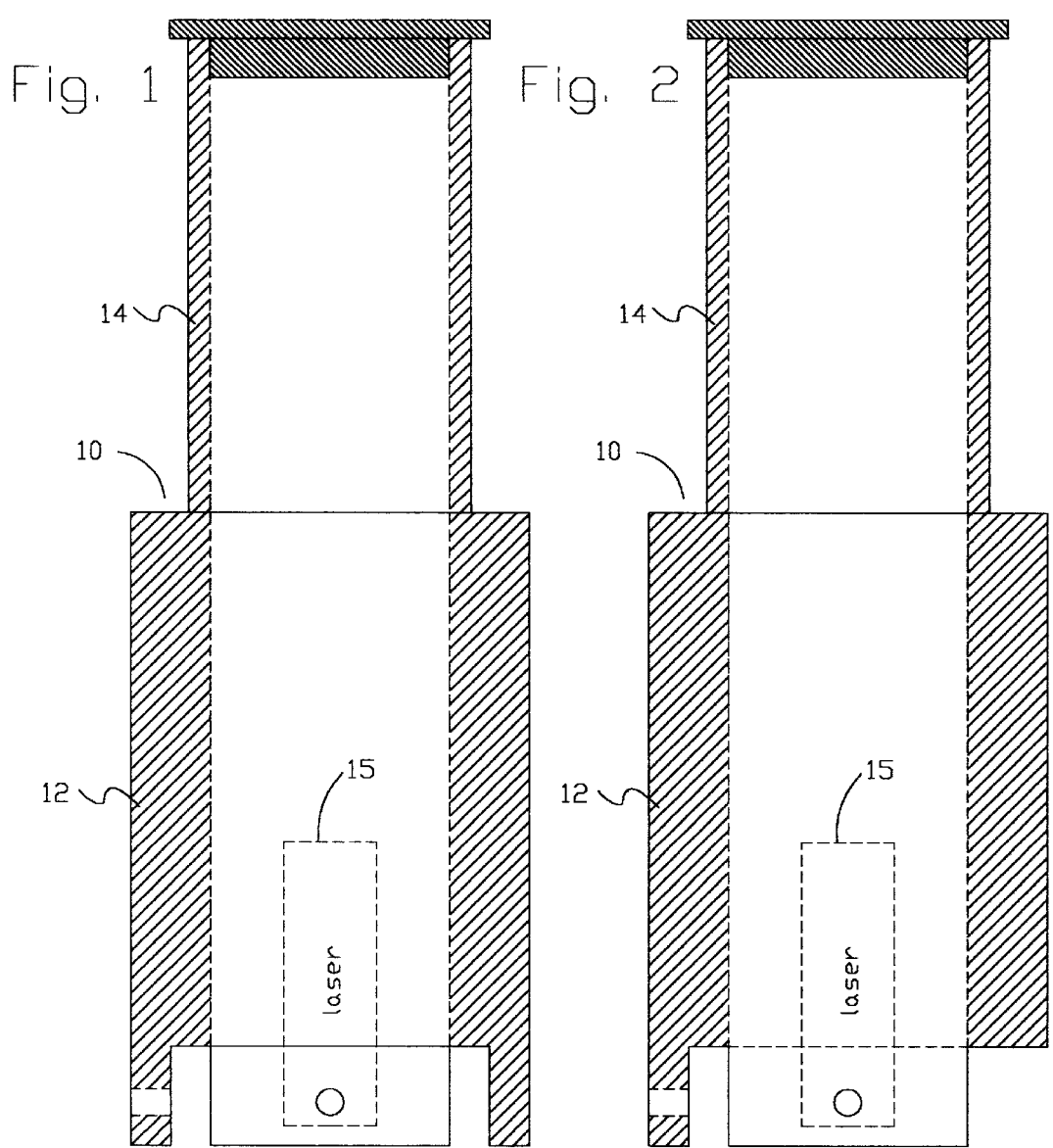
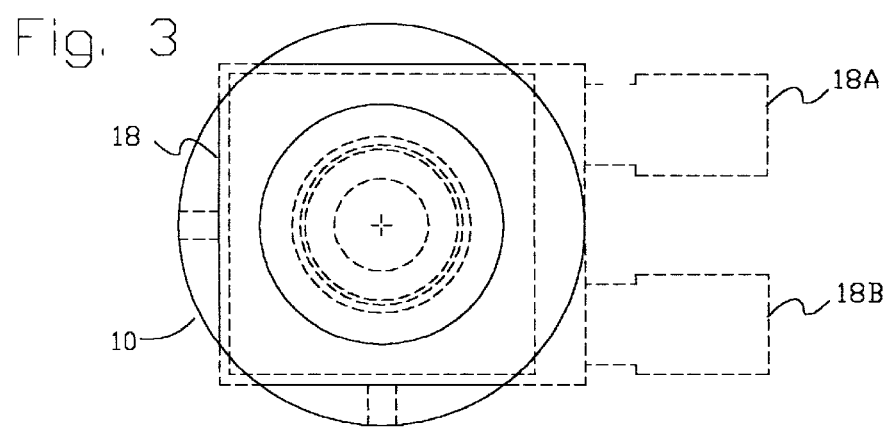

Fig. 12A
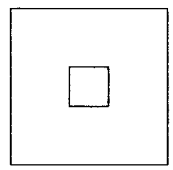
Fig. 12B  Fig. 12C  Fig. 12D  Fig. 12E
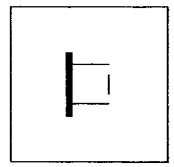 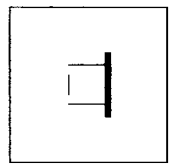 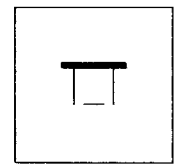 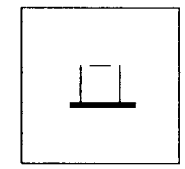
Fig. 13
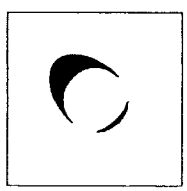 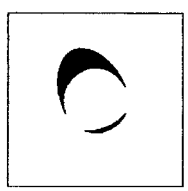 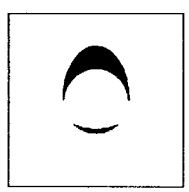  
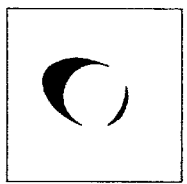 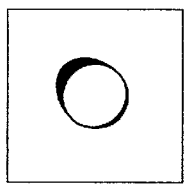 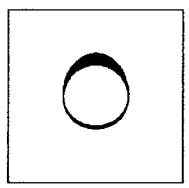 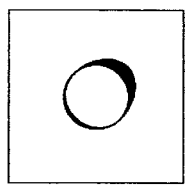 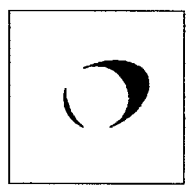
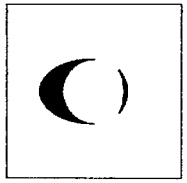 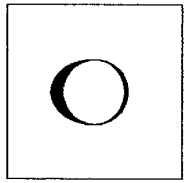 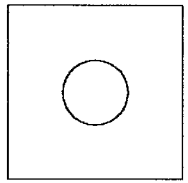 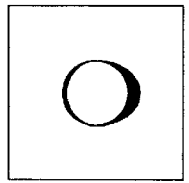 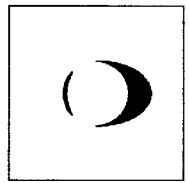
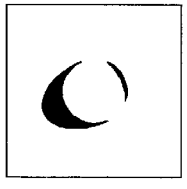 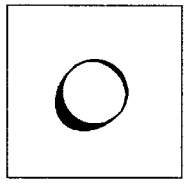 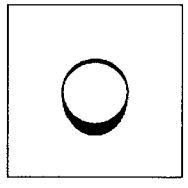 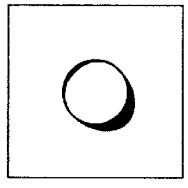 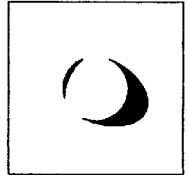
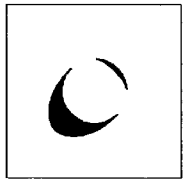 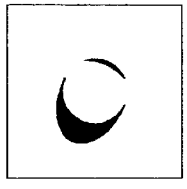 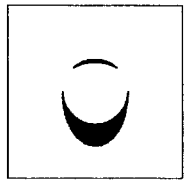 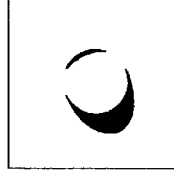 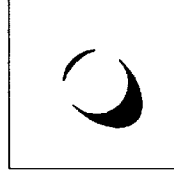

BEAM CENTERING SYSTEM

BACKGROUND OF THE INVENTION

This invention relates to systems, including methods, of precisely aligning devices using a laser beam transmitter and a target for locating the center of the beam at some distance from the transmitter. The invention is particularly directed to alignment of machine tools and production line apparatus using a succession of operating stations in apparatus, such as a system for making and/or processing fibers, filaments or wires. In such types of apparatus various stations may be provided for performing successive steps, such as forming, drawing, coating and gathering quite long lengths of fine (small diameter) filaments. In the context used in this application the term "filament" is intended to cover various types of very thin and very long strands, which may be of glass, plastic, or metal (e.g. wire).

The invention also is directed to a unique and accurate way to achieve alignment in various steps of the building construction industry. Such steps can be the alignment of structural columns or beams, alignment of passageways, such as plumbing or electrical chases, elevator shafts, and the like.

Relatively low power lasers are used to direct a beam of collimated light to define one or more centerlines in such uses, so as to achieve accurate alignment of the equipment involved, either in original construction or maintenance and/or repair.

Even though the laser beam has a small diameter, and little increase in the beam diameter along its path away from the laser source, it is still necessary to establish the exact center of the laser beam within quite small tolerance. Thus, there is a need for a system (method and equipment) to determine and indicate the exact center of the laser beam at various distances along its length, e.g. as the beam passes through the equipment or site to be aligned. This length may be in the order of a few yards, a few meters, or up to several hundred yards or meters.

The need is also present for accurate and relatively inexpensive target device which can withstand rough handling as under building construction conditions or the like, and will function at relatively large distances (vertically or horizontally) from a source of a laser beam to locate the center of the alignment beam, especially under ambient light conditions.

SUMMARY OF THE INVENTION

The equipment provided by the invention is a light beam transmitter, preferably of collimated light (i.e. a laser beam generator), and a passive target device using as its principal element a unique optical axicon having an optical axis which is intended to be aligned with a reference beam, such as discussed above, such axicon having a geometric center line or axis coincident with its optical axis. The axicon includes at least one facet which is designed to form a reference image when the optical axis is aligned with the reference beam, such image being symmetrical in a plane perpendicular to the optical axis. In other words, if the axis of the reference beam, and of the centered target axicon, is considered the Z axis, the image is formed in a plane transverse to such axis, namely the X and Y axes, arranged symmetrically about the center where the Z axis passes though the centers of the X and Y axes.

The optical element (special axicon) is supported in a holder, such as a tubular body having an inlet window and an output window, and is adapted to be supported a distance away from the transmitter. This distance may vary from less than one meter up to several hundred meters, depending upon (among other things) the application of the invention and the power of the transmitter. Several different forms of optical elements may be utilized, however each has the basic characteristics noted above.

In one embodiment the optical element includes an array of symmetrically arranged facets in the form of like surfaces of revolution (e.g. petals) around the optical axis and joining at a common point thereon. This embodiment will produce a multi-sided image, the number of sides corresponding to the number of facets.

Another embodiment of the optical element includes a single circular facet which is symmetrically arranged about the optical axis, and will produce a circular (or oval) image. Yet another embodiment of the optical element is comprised of a multi-sided closed array of facets (e.g. square, hexagonal, octagonal, or other combinations of fresnel lenses), each lens equal to the others in aperture.

It should be understood that all facets of the array making up the axicon (in each embodiment) direct to a common viewing window where a two-dimensional output image appears, as a circle or a multi-sided set of lines. When this target is centered on the axis of an incoming laser beam, the resulting circular or multi-sided image is two-dimensionally symmetrical, formed of a line or lines of equal width and brightness about the image. As the target is offset in either of two axes perpendicular to the beam direction (beam center or Z axis), the images become non-symmetrical and change shape and brightness, some parts of the image becoming smaller and dimmer and other parts becoming larger and brighter. This change in the image(s) is easily perceptible.

Such a target is supported precisely in a holder which is capable of being supported (e.g. mounted) at any location where the center of a reference beam is to be detected and located. The beam transmitter (generator and projector) is precisely supported in a holder at a predetermined point of the origin. The laser beam transmitter may include x-y adjusting mechanism which can be used to center the beam along a desired reference line, with respect to its holder.

The target includes a body, preferably tubular, and may include an internal light guide. An input or inlet window is at one end of the body, and an output or viewing window is either at the other end of the body, for example at the end of the light guide facing the other end of the tube. Alternately, a side directing reflector can be provided at the other end to direct the beam from the axicon element onto a viewing window at one side of the body. The viewing window includes a screen of diffusing material.

Thus an observer can adjust the position of the target body, or of the equipment on which the target is supported, until the image appears symmetrical in shape and equal in size and luminance, indicating that the centerline (longitudinal and optical axis) of the target and its holder, and thus the equipment to which it is attached, is precisely aligned with the center of the reference beam.

Other objects and advantages of the invention will be apparent from the following description, the accompanying drawings, and the appended claims.

BRIEF DESCRIPTION OF THE DRAWINGS

FIG. 1 is a cross-sectional view of the transmitter, taken from the front of the transmitter housing;

FIG. 2 is a cross-sectional view of the transmitter, taken from the side of the transmitter housing;

FIG. 3 is a bottom view of the transmitter;

FIGS. 12A–12E are diagrams illustrating the on-axis, and various off-axis conditions illustrated by the images formed by the target using the four facet axicon embodiments;

FIG. 13 is a view illustrating the images formed when the reference beam is off-center with respect to the single facet axicon embodiments;

DESCRIPTION OF THE PREFERRED EMBODIMENT

Figure 4:
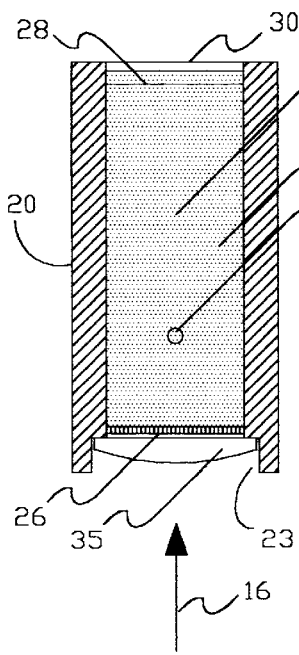
FIG. 4 is cross-sectional view of the target.
Figure 5:
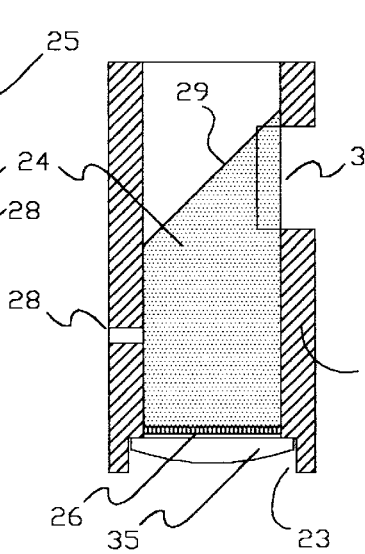
FIG. 5 is a cross-sectional view of a modified form of the target incorporating an internal reflector for side viewing.
Figure 6:
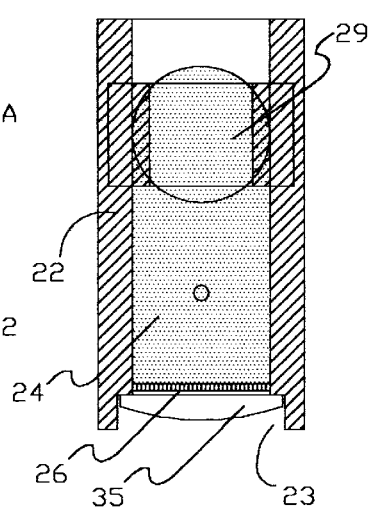
FIG. 6 is a cross-sectional view taken at right angles to FIG. 5.

The invention in its simplest form comprises a laser beam transmitter 10 (FIGS. 1–3) and a cooperating target apparatus 20 (FIGS. 4–6). The transmitter includes a tubular body 12, a tubular holder 14 extending from the top of body 12, and an LED laser diode 15 supported in the bottom of body 12 on an X-Y adjusting mechanism 18 (of conventional construction) which can tip the laser diode 15 in either or both the horizontal X and Y axes, e.g. as viewed from above the transmitter. The X-Y adjusting mechanism has micrometer adjusting knobs 18A, 18B. The transmitter produces a reference beam 16 of collimated light which can be detected at points along the beam path by the target provided by this invention to establish centers or reference locations.

Target 20 is a passive target device which includes a tubular body 22 having an input port or window 23 formed in one of its ends. Inside body 22 there is an optional light guide 24 in the form of an optical acrylic rod section 25 having a flat first end face 26 at or near window 23 and a second end face 28. The face 28 may include a diffusing surface 30 which provides a viewing screen. Optionally, the end face 28 of light guide 24 may be formed as a reflector 29 (FIG. 5) formed at 45 degrees from the optical axis of the target, to reflect an image to a side facing viewing screen 30A. A set screw 29 in the side of body 22 serves to hold light guide 24 in an adjusted position.

At the top of rod section 25 is mounted a unique special axicon element 35 which comprises one or more facets that will cooperate to form an image which is visible on the viewing screen. All the unique optical axicons disclosed herein have an optical axis OA which is intended to be aligned with the reference beam 16. Each embodiment of axicon has a geometric center line or axis 36 which is coincident with its optical axis OA. The axicons include one or more facets which are designed to form a reference image when the optical axis OA is aligned with the axis of reference beam 16, such image being symmetrical in a plane perpendicular to the optical axis OA. In other words, if the axis (i.e. the centerline) of reference beam 16, and of the centered target axicon 35, is considered the Z axis, the image is formed in a plane transverse to such axis, namely the plane defined by the X and Y axes, and such image appears symmetrical about the center where the Z axis passes though the centers of the X and Y axes.

The principal optical element, the special axicon 35, is supported in tubular body 22 as shown in FIG. 4. near inlet window 23 and light guide 24 (if used). This distance may vary from less than one meter up to several hundred meters, depending upon (among other things) the application of the invention and the power of the transmitter. Several different forms of axicon may be utilized, however each has the basic characteristics noted above.

Figure 7A:
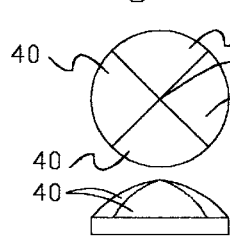
FIG. 7A is a top view of an axicon with four facets and FIG. 7B is a side view of FIG. 7A.
Figure 7B:
Figure 7C:
FIG. 7C illustrates an image formed by the embodiment of FIGS. 7A & 7B.

In one embodiment the optical element includes an array of symmetrically arranged facets 40 in the form of like surfaces of revolution (e.g. petals) around the optical axis and joining at a common point thereon. This embodiment will produce a multi-sided image, the number of sides corresponding to the number of facets (four as seen in FIGS. 7A and 7B).

Figure 8A:
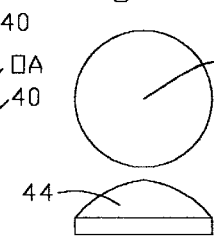
FIG. 8A is a top view of an alternate axicon having a single facet and FIG. 8B is a side view of FIG. 8A.
Figure 8B:
Figure 8C:
FIG. 8C illustrates an image formed from the embodiment of FIGS. 8A & 8B.

Another embodiment of the optical element (FIGS. 8A & 8B) includes a single facet 44 which is a surface of revolution formed symmetrically about the optical axis OA, and will produce a circular (or oval) image, depending upon the alignment of the optical axis of the axicon with the centerline of the reference beam.

Figure 9A:
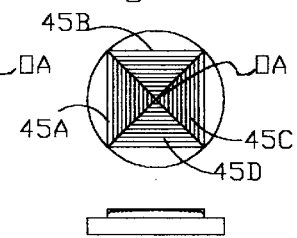
FIG. 9A is a view of an alternate four facet fresnel-type axicon and FIG. 9B is a side view of FIG. 9A.
Figure 9B:
Figure 9C:
FIG. 9C illustrates an image formed from the embodiment of FIGS. 9A & 9B.

Yet another embodiment of the optical element is comprised of a multi-sided closed array of facets (e.g. square, hexagonal, octagonal, or other combinations of fresnel lenses), each lens equal to the others in aperture. This is illustrated in FIGS. 9A and 9B, where four like fresnel lenses, each having multiple parallel facets 45A, 45B, 45C and 45D, are arranged in a square configuration centered about the optical axis OA, and when the optical axis of this axicon is centered on the reference beam, a square image (FIG. 9C) will appear.

Figure 10A:
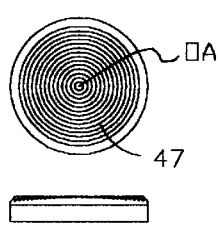
FIG. 10A is a top view of an alternate circular fresnel-type axicon and FIG. 10B is a side view of FIG. 10A.
Figure 10B:
Figure 10C:
FIG. 10C illustrates an image formed from the embodiment of FIGS. 10A & 10B.

FIGS. 10A and 10B show an array of coaxial circular fresnel lenslets (or elements) having multiple facets 47 arranged in concentric circles about the optical axis OA. This axicon also produces a symmetrical circular image (FIG. 10C), when its optical axis is aligned with the beam centerline.

Figure 11A:
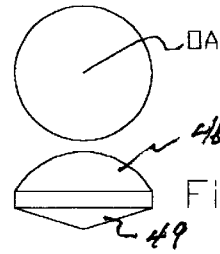
FIG. 11A is a top view of another form of single facet axicon and FIG. 11B is a side view of FIG. 11A.
Figure 11B:
Figure 11C:
FIG. 11C illustrates an image formed from the embodiment of FIGS. 11A & 11B.

FIGS. 11A and 11B illustrate a further embodiment of axicon which comprises an upper or outer circular lens 48 and a lower or inner single facet member formed about the axis OA of the unit. This axicon also produces a uniform circular image (FIG. 11C). Obviously a multi-facet lower member could also be used in which case the image would be multi-sided.

It should be understood that all facets of the array making up the axicon (in each embodiment) direct to a common viewing window, where an output image appears as a circle or as a multi-sided set of lines. When this target is centered on the axis of an incoming laser beam, the resulting circular or multi-sided image is symmetrical, formed of a line or lines of equal width and brightness about the image. As the target is offset with respect to the reference beam centerline (or Z axis), the images become non-symmetrical and change shape and brightness by some lines, or parts of the line(s), becoming smaller and dimmer and other lines becoming larger and brighter.

This is illustrated in FIGS. 12A–12E, wherein the "on center" condition is shown in FIG. 12A, and FIGS. 12B through 12E show the image as nonsymmentrical in four different directions. As the target is offset in either of two directions perpendicular to the beam centerline, one set of lines changes by one line becoming smaller and dimmer and its mate becoming larger and brighter (see FIGS. 12B–12E). When such images are viewed, the user can manipulate the target accordingly until the symmetrical image is achieved.

Using those embodiments of the axicon 35 which produce a circular image, when the optical axis OA is coincident with the beam centerline a fine iniform circular image, as shown in the center frame of FIG. 13. When the optical axis OA is offset from the beam centerline, the images become oblong and of different density in various directions (see the surrounding frames in FIG. 13).

Figure 14:
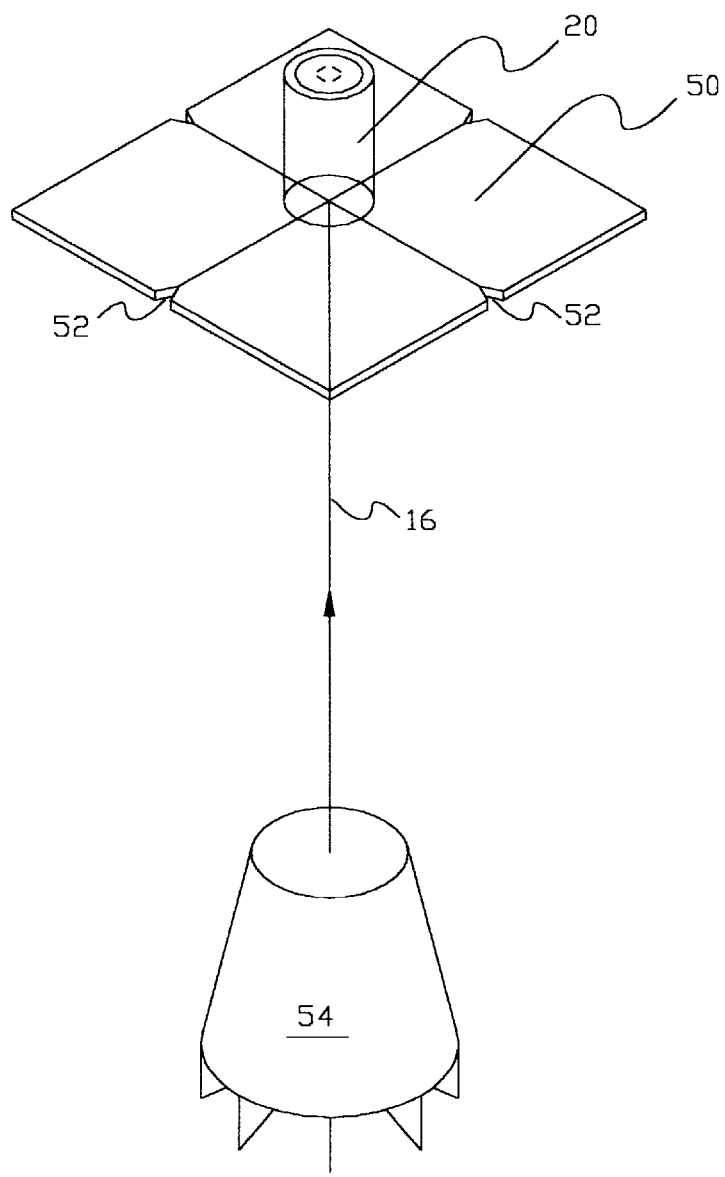
FIG. 14 is a diagram illustrating the use of the target in construction alignment projects.

The transmitter and target disclosed herein are particularly useful for alignment procedures in the construction of steel beam building framework and various chases and/or passages in a building, in the construction and/or refurbishing of elevators, in shipbuilding, and in establishing references in excavating, wall construction, and the like. Thus, in FIG. 14 the target 20 is mounted at the center of a translucent plate 50 which may be of relatively large size, for example 400 square inches. Plate 50 has cross-lines of reference, with marking notches 52 and the plate can be supported in a shaft or chase (for example) along which a reference beam is directed from a laser beam generator 54. The beam will produce a spot on plate 50 as the plate is maneuvered to a position in which the reference beam is aligned with the target. Then, observing the image formed in the target, the plate can be precisely positioned with the optical axis of the axicon in the target coincident with the center of the reference beam. Appropriate markings can then be made on the surrounding structure to record the precise alignment.

Figure 15:
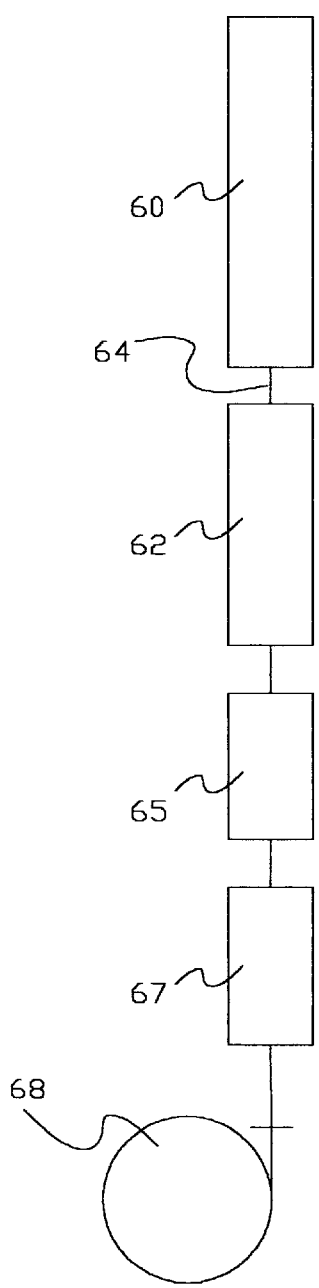
FIG. 15 is a block diagram of a system in which the present invention may be used for checking alignment.

FIG. 15 is a diagrammatic illustration of a system (or systems) in which the multiple alignments are necessary in the setup and use of one or more operating stations in apparatus for making and/or processing fibers, filaments or wires. In such apparatus various stations may be provided for forming, drawing, coating and gathering extensive lengths of fine (small diameter) filaments, e.g. various types of thin and very long strands, which may be of glass, plastic, or metal such as wire.

In accordance with this invention, relatively low power lasers are used to determine the centerline of the apparatus comprising the various stations, so the filament being processed travels a precise path through the several stations. When the apparatus is installed and when it is serviced, it is necessary to check the alignment of the equipment at the several stations, and the laser alignment devices are useful at these times.

Referring to FIG. 15, a source of filament material is indicated at 60; this source could be a furnace and preform station for fiberglass strands, or an extruder station from which plastic strands are extruded, or a supply reel station for metal wire or other filament material to be processed. A monitoring station 62 is next in line along the path 64 of the moving filament. Station 62 can be, for example, a detector which observes (see U.S. Pat. No. 5,448,362 issued Sep. 5, 1995) and records abnormalities in the diameter of the filament.

The next station 65 may be a coating head which places a continuous coating material, such as a plastic insulating or protective coating, around the moving filament. The fourth station 67 may be an apparatus which adds and overcoat, or sizes the first placed coating. The final station 68 in the example is a take-up reel station in which the filament material is gathered on a reel.

The process of using the laser alignment system (transmitter & target) involves mounting the transmitter at a predetermined position, e.g. in the first station 60, for example in a chuck or other fixture which will precisely align with the center of the filament supplied therefrom in normal operation. The laser beam can then be aligned with a bench mark, preferably a permanent benchmark which is a part of the system as constructed, this being shown schematically at 70. The X-Y adjusting mechanism 18 is then manipulated in a plane normal to the optical axis as necessary to center the laser beam through the stations of the filament system onto benchmark 70. Then, target 20 is mounted in a chuck, collet, or fixture which is part of each station, and which has provisions for adjustments along X and Y directions perpendicular to the laser beam which is now centered on the path of a filament. With the target in place, the images produced in the target (FIGS. 12A–E, or FIG. 13) are observed through the viewing port and the fixture is manipulated in a plane normal to the optical axis until the four lines are equal in brightness, as illustrated in FIG. 12A. Misalignment conditions which can be encountered using the four element optical lens are illustrated in FIGS. 8B–E, on which appropriate notations appear. The procedure is then repeated at each station until all are aligned with the laser beam.

Similar use of the center-finding target in building construction will align beams, passages, etc. to attain easily alignment accuracy better then (less than) ±$\frac{1}{16}$ inch (1 mm.) at distances in the order of 500 feet along the beam from transmitter 20.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. A target for locating the centerline of a reference beam, comprising a target body having an input window and a viewing window spaced apart on said body, an axicon supported in said body adjacent said input window for intercepting a reference beam, said axicon having an optical axis and having at least one facet formed symmetrically about said optical axis, a viewing screen at said viewing window for receiving and displaying an image when the reference beam passes through said axicon, said axicon being adapted to form an image discernable at said screen, such image being symmetrical as to shape and intensity when such reference beam is coaxial with said optical axis of said axicon and being asymmetrical when such reference beam is not coaxial with said optical axis, whereby an observer can discern the image and determine when the image is symmetrical as the target is moved about the centerline of the reference beam.

2. A target as defined in claim 1, wherein said axicon includes an array of symmetrically arranged facets formed as like surfaces of revolution around the optical axis.

3. A target as defined in claim 1, wherein said axicon includes a single facet formed as a surface of revolution which is symmetrical about the optical axis.

4. A target as defined in claim 1, wherein said axicon includes a multi-sided closed array of facets, each equal in aperture to the other facets, said array being centered about the optical axis.

5. A target as defined in claim 4, wherein said facets are fresnel lenses.

6. A target as defined in claim 1, wherein said axicon includes a circular fresnel lens hiving multiple lenslets arranged on concentric circles about the optical axis.

7. A target as defined in claim 1, wherein said axicon includes an outer circular lens combined with an inner axicon having at least one facet formed symmetrically about the optical axis.

8. A target as defined in claim 1, wherein said input window and said viewing window with and said viewing screen are arranged at opposite ends of said target body.

9. A target as defined in claim 1, wherein said input window is at one end of said target body and said viewing window with said viewing screen are arranged to one side of said target body, and a reflector in said body directing the beam passing through said axicon to said viewing screen.

10. A target as defined in claim 1, including a light guide within said target body between said input window and said viewing window.

11. A passive target for locating the centerline of a reference laser beam and aligning with such centerline, comprising a target body having an input window and a viewing window spaced apart on said body, an axicon supported in said body adjacent said input window for intercepting a reference beam, said axicon being centered in said body and having an optical axis and at least one facet formed symmetrically about said optical axis, a viewing screen at said viewing window for receiving and displaying an image formed by said axicon when the reference beam passes through said axicon, said axicon being adapted to form an image discernable at said screen, such image being symmetrical as to shape and intensity when such reference beam is coaxial with said optical axis of said axicon, and such image being asymmetrical in shape and/or of non-uniform intensity when such reference beam is not coaxial with said optical axis, whereby an observer can discern the image and determine when the image is symmetrical as the target is moved so the optical axis of said axicon is coaxial with the centerline of the reference beam.

12. A target as defined in claim 11, wherein said axicon includes multiple like facets arrayed around said optical axis, such that axicon produces a multi-sided image at said viewing screen, which image is symmetrical when the optical axis of said axicon is coaxial with the centerline of the reference beam.

13. A target as defined in claim 11, wherein said axicon includes at least one circular facet arrayed around said optical axis, such that axicon produces a circular image at said viewing screen, which image is circular when the optical axis of said axicon is coaxial with the centerline of the reference beam and is non-circular whenever the optical axis of said axicon is not coaxial with the reference beam centerline.

14. A system for locating the centerline of a reference laser beam and aligning with such centerline, comprising means for transmitting a reference laser beam along a target body having an input window and a display window spaced apart on said body, an axicon supported in said body adjacent said input window for intercepting a reference laser beam, said axicon being centered in said body and having an optical axis and at least one facet formed symmetrically about said optical axis, a screen at said display window for receiving and displaying an image formed by said axicon when the reference laser beam passes through said axicon, said axicon being adapted to form an image at said screen, such image being symmetrical as to shape and intensity when such reference laser beam is coaxial with said optical axis of said axicon, and such image being asymmetrical in shape and/or of non-uniform intensity when such reference laser beam is not coaxial with said optical axis, whereby it is possible to determine when the image is symmetrical as the target is moved to place the optical axis of said axicon coaxial with the centerline of the reference laser beam.

15. A target as defined in claim 14 wherein said axicon includes multiple like facets arrayed around said optical axis, such that axicon produces a multi-sided image at said display screen, which image is symmetrical when the optical axis of said axicon is coaxial with the centerline of the reference laser beam.

16. A target as defined in claim 15, wherein said axicon includes at least one circular face arrayed around said optical axis, such that said axicon produces a circular image at said display screen, which image is circular when the optical axis of said axicon is coaxial with the centerline of the reference laser beam and is non-circular whenever the optical axis of said axicon is not coaxial with the reference laser beam centerline.

* * * * *